3,016,761
CONTROL LINE REGULATOR
Robert J. Wrighton and Clifford E. Cushman, Burbank, Calif., assignors, by mesne assignments, to Pacific Scientific Company, San Francisco, Calif., a corporation of California
Original application Jan. 30, 1956, Ser. No. 562,073, now Patent No. 2,921,480, dated Jan. 19, 1960. Divided and this application Aug. 31, 1959, Ser. No. 845,047
4 Claims. (Cl. 74—501.5)

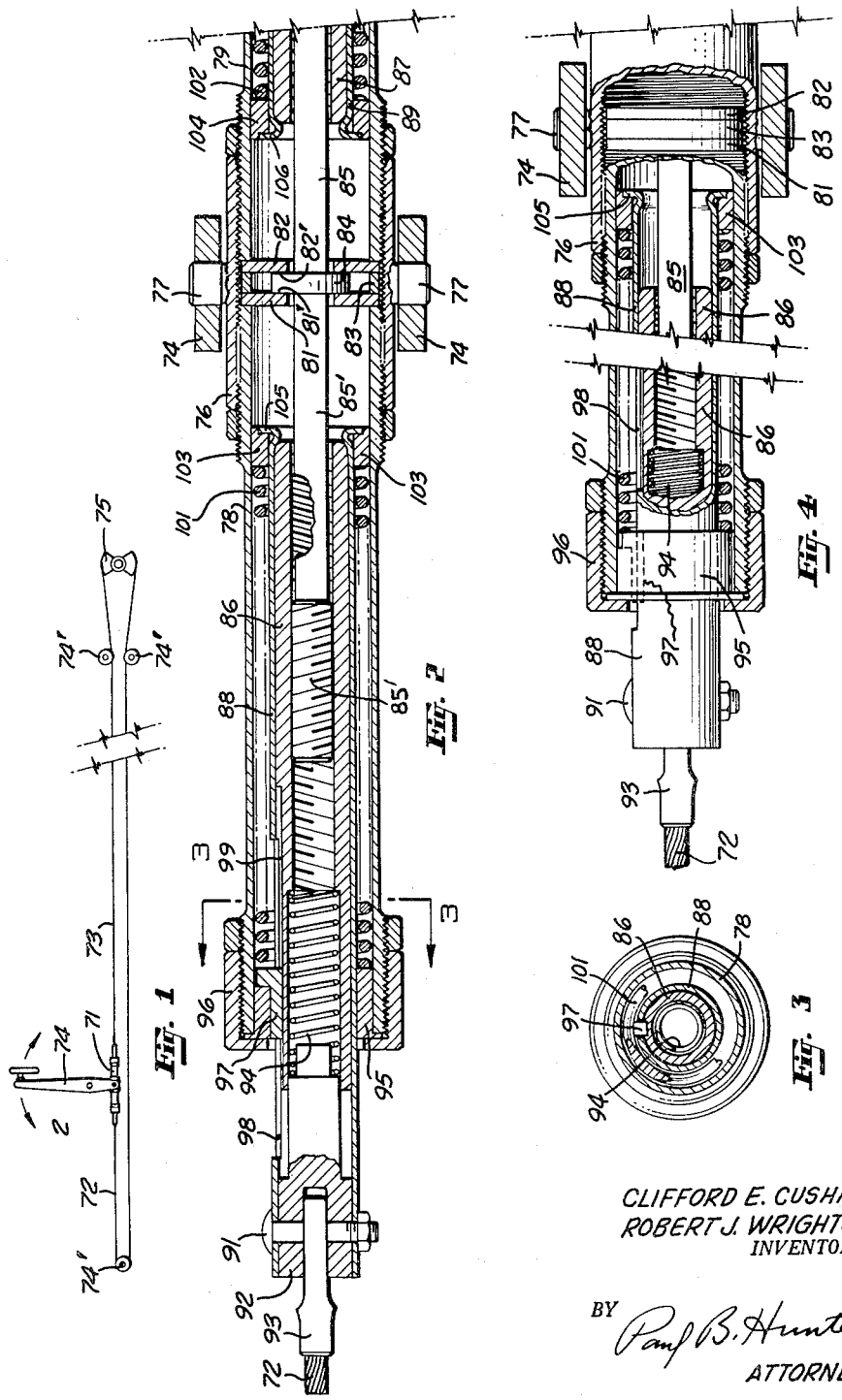
Jan. 16, 1962     R. J. WRIGHTON ETAL     3,016,761
CONTROL LINE REGULATOR
Original Filed Jan. 30, 1956
CLIFFORD E. CUSHMAN
ROBERT J. WRIGHTON
INVENTORS

United States Patent Office 3,016,761
Patented Jan. 16, 1962

This invention relates in general to control line apparatus, and more particularly to control line regulators utilized for maintaining uniform tension in control lines extending between controlling and controlled points, the regulator acting automatically to compensate for variations in length of the lines resulting from such things as extreme temperature changes.

These tension regulators find their main use in modern aircraft where the flexing of air frames and operations in widely divergent temperature environments result in relatively rapid and pronounced variations in distance between control and controlling points. These regulators in common use consist of one or more compression or regulator springs, which exert a tension on the control lines or cables equal to the desired rig load of the cable system, plus an automatically locking mechanism which, although it allows the regulator spring forces to be exerted on the cables so long as the cables are under neutral or balanced forces, i.e., tension on the control cables are equal, to thereby maintain the desired rig loading, it locks up immediately upon a control force being applied to one of the control cables to prevent further tension regulating movement and to transmit the control force to the controlled point.

In these control regulators heretofore used it often happens that the control force applied to one of the cables is great enough to cause this cable to be stretched somewhat during the period the force is being applied. This causes undesired slack to be produced in the untensioned cable, resulting at times in the fouling of the control lines, which these prior art regulators were incapable of preventing. This and other drawbacks to the prior art devices will be explained more fully in the detailed description of this invention to follow.

The present application is a division of U.S. patent application Serial No. 562,073, filed January 30, 1956, now Patent No. 2,921,480, issued Jan. 19, 1960, by the same inventors.

It is, therefore, the principal object of the present invention to provide novel improved control line tension regulator devices which are fast-acting, dependable in operation, and maintain taut lines at all times.

One feature of the present invention is the provision of a novel control line regulator structure which operates to automatically take up slack in an associated control line during periods when the control line regulator is normally locked against control line tension regulation.

Another feature of the present invention is the provision of a novel spring structure for use in control line regulator devices for taking up slack in control lines occurring during periods when the regulator is locked.

Another feature of the present invention is the provision of a novel control line regulator in which the normal regulator spring serves as a control line tension regulator during unlocked periods of the regulator and doubles as a slack absorber spring during locked periods of the regulator.

These and other features and advantages of the present invention will become more apparent from a perusal of the following specification taken in connection with the accompanying drawings wherein:

FIG. 1 is a schematic view showing a control line tention regulator device which embodies the present invention as utilized in a cable control system;

FIG. 2 is a longitudinal cross-section view of the novel regulator device shown in FIG. 1, only one-half of the regulator being shown since the other half is similarly constructed;

FIG. 3 is a cross-section view of the regulator of FIG. 2 taken along section line 3—3; and FIG. 4 is a fragmentary longitudinal cross-section view similar to FIG. 2 showing the novel regulator device in a different position of operation.

Referring to FIGS. 1, 2, 3 and 4, there is shown a type of control cable tension regulator device which incorporates the novel slack-absorber feature of this invention. The type of cable regulator shown is of the screw synchronizer family, several examples of which are found in U.S. Patent Re. 23,933, issued February 1, 1955, to C. E. Cushman, entitled "Control Line Compensating Apparatus." This particular regulator shown is an in-line unit installed at a controlling point as illustrated in FIG. 1. The in-line regulator unit 71 operates to maintain desired rig tension in the control cables 72, 73 as will be explained subsequently, the unit locking on movement of control lever 74 to transmit this control movement over idler pulleys 74' to the controlled mechanism 75.

This unit 71, as seen in FIGS. 2 and 3, comprises a tubular collar 76 which is adapted to couple, as by trunnions 77, to a control lever such as 74 in FIG. 1 . The opposed ends of the collar 76 are internally threaded. Since the right-hand end of this regulator device is identical to the left-hand end, it has been omitted so that the left-hand end may be enlarged. A pair of external stop members 78 and 79 are threaded into the collar from opposite ends, the two tubes 78 and 79 having a pair of annular braking surface members 81 and 82 compressed between their inner ends. An annular spacer ring 83 is positioned between the braking surface members 81 and 82 to provide suitable spacing therebetween for a brake disk 84. The spacing is such that the disk 84 may rotate in the space between the braking surfaces 81' and 82' of braking members 81 and 82 without friction braking, provided there is no longitudinal force exerted on brake disk 84 forcing it against either of surfaces 81' or 82'. The brake disk 84 is an integral part of a synchronizer screw 85 which has a high pitch right-hand thread on its left-hand end 85' and a high pitch left-hand thread on its right-hand end (not shown) as viewed in FIG. 2. Screwed over the opposed ends of the synchronizer screw 85 are a pair of elongated tubular nuts 86 and 87. Encircling the elongated nuts 86 and 87 are a pair of elongated sleeves 88 and 89. The inner ends of the sleeves 88 and 89 are indented slightly so that these ends will not be large enough to slip over the inner ends of the synchronizer nuts 86 and 87. The outer ends of the sleeves 88 and 89 are fixedly secured as by bolts 91 to end plugs 92 and control cable terminations 93 of cables 72 and 73. The inner ends of end plugs 92 are turned down slightly to mount one end of compression springs 94, the other ends of the compression springs 94 engaging ridges cut into the internal bore of the tubular nuts 86 and 87.

Bearings 95 encircle the sleeves 88 and 89 and are fixedly mounted in the outer ends of external tubes 78 and 79 by means of end caps 96. Keys 97 are secured in the bearings 95, these keys extending through elongated slots 98 in the sleeves 88 and 89, and into keyways 99 in the tubular nuts 86 and 87. These keys 97 prevent relative rotation between the outer tubes 78, 79, sleeves 88, 89 and tubular nuts 86, 87. Compression springs 101 and 102 encircle the sleeves 88 and 89, respectively, the outer ends of these springs engaging the bearings 95 while the inner ends bear against annular seats 103 and 104 which are secured against flanged portions 105 and 106 on the inner ends of sleeves 88 and 89 respectively.

In operation, the compressed tension-regulator springs 101 and 102 bear against the seats 103 and 104 and thus urge the sleeves 88 and 89 inwardly. The sleeves 88 and 89 slide within the bearings 95, and, acting through bolts 91 and associated cable terminals 93, draw the control cables 72 and 73 taut. Compressed follow-up springs 94 urge the elongated synchronizer nuts 86 and 87 in an inwardly direction to maintain the inner ends of these nuts in engagement with the indented inner ends 105 and 106 of sleeves 88 and 89. As the nuts 86 and 87 move inwardly toward each other, the high pitch synchronizer screw 85 rotates, the braking disk 84 turning between the braking members 81 and 82. If the tensions in the control cables 72 and 73 increase, due to temperature changes for example, the sleeves 88 and 89 are pulled outwardly against the force of springs 101 and 102, the sleeves carrying the nuts 86 and 87 along with them, synchronizer screw 85 turning as nuts 86 and 87 move. Sleeves 88 and 89 and nuts 86 and 87 thus move back and forth longitudinally to maintain the control cable tensions at a uniform tautness.

When a working force is applied to the collar 76 through trunnions 77, for example, assume the collar is urged to the right in FIG. 2, the braking member, in this case, member 81, is forced against the braking disk 84 and prevents the synchronizer screw from rotating. The control force or pull on the collar 76 is therefore coupled through the screw 85 to the nut 86 and then to the sleeve 88 which in turn pulls on the control cable 72. This force or pull on control cable 72 produces the necessary controlling motion at the controlled mechanism 75 (FIG. 1), the in-line regulator device moving to the right as viewed in FIG. 1. A similar lock-up of the tension regulator device occurs when the controlling force is applied to the collar 76 in the opposite direction, in this case, braking member 82 engages the brake disk 84 to prevent further regulating rotation of the synchronizer screw 85. The control movement is therefore transmitted to the control cable 73.

Assume that the force applied to the lever 74 is such that the tensioned control cable 73 stretches. This unit will automatically act to take up the slack created in the untensioned cable 72 as follows with reference to FIG. 4. The compression spring 101 bears against seat 103 and thus urges sleeve 88 to slide longitudinally inwardly and take up the slack in the control cable 72. The sleeve 88 moves relative to the elongated nut 86 which is locked to the screw 85, the follow-up spring 94 being compressed between the end plug 92 and the nut 86. When the force is removed and the stretched cable 73 relaxes, the sleeve 88 slides back on the nut 86 until the indented end 105 engages the inner end of the nut 86 as shown in FIG. 2.

Since many changes could be made in the above construction of the control line regulator and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control line tension regulator device adapted for coupling to the two control line terminals of a control line system comprising a synchronizer screw threaded on each end, the threads on one end being reversed relative to those on the opposite screw end, elongated nut members threaded over the ends of the synchronizer screw, a sleeve member associated with each nut member, said sleeve member being slidably mounted over the associated nut member, the outer ends of said sleeve members being adapted to couple to the control line terminals of the control line, pulling forces on said control line terminals urging said sleeves to move endwise outwardly, regulator springs in said device associated with said sleeve members for resiliently urging said sleeve members endwise toward each other to thereby tension the control lines coupled to said control line terminals, means urging said nut members against the inner ends of said sleeves such that said nut members move endwise inwardly toward and outwardly from each other as said sleeves move, said synchronizer screw freely revolving as said nuts move back and forth, and means for locking said synchronizer screw against revolving when a load tension is applied to one control line terminal greater than that applied to the other line terminal, said regulator springs urging said sleeves to slidably move endwise inwardly during said locked condition, said sleeve associated with said other line terminal having the lesser tension slidably moving relative to its associated locked nut to take up slack in the control line coupled to said other line terminal.

2. A control line tension regulator device as claimed in claim 1 wherein said resilient means urging said nut members against said sleeves includes compression springs urging the nut members to follow said sleeves during inward endwise movement of said sleeves.

3. A control line tension regulator device adapted for coupling to the two control line terminals of a control line system, comprising a synchronizer screw threaded on each end and having a brake disc fixedly secured at the center portion thereof, the threads on one end of the screw being reversed relative to those on the opposite end, elongated nuts having a threaded inner surface and being carried on the threaded ends of the synchronizer screw, a sleeve member associated with each nut member, said sleeve members being slidably mounted over the associated nut members, the outer ends of the sleeve members being adapted to couple to the control line terminals of the control line, the inner ends of said sleeve members having flanged portions adapted to engage the inner ends of the associated nuts, outwardly directed tension forces on said control line terminals urging said sleeves to move endwise outwardly relative to said synchronizer screw, a housing for said device, said housing having secured therein a pair of annular brake members, said annular brake members being positioned on either side of said brake disc and normally allowing said brake disc to rotate therebetween when no loading force is being applied to one of the control terminals, regulator springs in said device acting between said housing and each of said sleeves for resiliently urging said sleeve members endwise toward each other thereby maintaining the control line coupled to said control line terminals at a uniform tension, resilient means acting against said nut members to urge the inner ends of said nut members against the flanged inner ends of said sleeves such that said nut members normally move endwise inwardly toward and outwardly from each other as the associated sleeves normally move to maintain an even tension on said control lines, said synchronizer screw freely revolving as said nuts move back and forth, one of said annular brake members engaging said brake disc to prevent said synchronizer screw from revolving when a control force is applied to said housing exerting a control tension through said synchronizer screw and the associated tubular nut and sleeve to one control line, the regulator spring associated with the control line to which no load tension is applied urging its associated sleeve to slidably move endwise inwardly during the locked condition of said synchronizer screw and associated nut, said sleeve slidably moving relative to its associated lock nut to take up any slack in the control line.

4. A control line tension regulator as claimed in claim 3 wherein said resilient means includes a pair of follow-up springs acting between the outer ends of said sleeves and the outer ends of said nuts.

References Cited in the file of this patent
UNITED STATES PATENTS

| | | |
|---|---|---|
| Re. 23,933 | Cushman | Feb. 1, 1955 |
| 2,744,420 | Pigford | May 8, 1956 |
| 2,814,210 | Ford | Nov. 26, 1957 |

FOREIGN PATENTS

| | | |
|---|---|---|
| 590,962 | Great Britain | Aug. 1, 1947 |